United States Patent
Höme et al.

(10) Patent No.: US 11,218,442 B2
(45) Date of Patent: Jan. 4, 2022

(54) COMMUNICATION DEVICE, CONTROL UNIT AND METHOD FOR DETERMINING DEVICE ADDRESSES WITHIN A COMMUNICATION NETWORK OF AN INDUSTRIAL AUTOMATION SYSTEM

(71) Applicant: Siemens Aktiengesellschaft, Munich (DE)

(72) Inventors: Stephan Höme, Schwabach (DE); Harald Albrecht, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/050,083

(22) PCT Filed: Apr. 27, 2018

(86) PCT No.: PCT/EP2018/060872
§ 371 (c)(1),
(2) Date: Oct. 23, 2020

(87) PCT Pub. No.: WO2019/206427
PCT Pub. Date: Oct. 31, 2019

(65) Prior Publication Data
US 2021/0250328 A1 Aug. 12, 2021

(51) Int. Cl.
*H04L 29/12* (2006.01)
*H04L 12/18* (2006.01)
(Continued)

(52) U.S. Cl.
CPC ...... *H04L 61/2069* (2013.01); *H04L 12/1845* (2013.01); *H04L 61/2038* (2013.01);
(Continued)

(58) Field of Classification Search
None
See application file for complete search history.

(56) References Cited

U.S. PATENT DOCUMENTS

| 10,341,173 B2 | 7/2019 | Albrecht |
| 2005/0243739 A1* | 11/2005 | Anderson ......... H04L 29/12783 370/254 |

(Continued)

FOREIGN PATENT DOCUMENTS

| CN | 104272204 | 1/2015 |
| CN | 105897460 | 8/2016 |

(Continued)

OTHER PUBLICATIONS

PCT International Search Report and Written Opinion of International Searching Authority dated Jul. 19, 2018, corresponding to PCT International Application No. PCT/EP2018/060872 filed Apr. 27, 2018.

(Continued)

*Primary Examiner* — Ajit Patel
(74) *Attorney, Agent, or Firm* — Cozen O'Connor (57) ABSTRACT

Method for determining device addresses in response to name resolution queries within a communication network, wherein communication devices each calculate a target value from the associated device name of the communication device in question by means of a predefined function, where the communication devices each determine a multicast address from at least part of the calculated target value and from a selected multicast address stem and receive multicast datagrams addressed to the determined multicast address, where a name resolution query is addressed in accordance with the determined multicast address in question, and where a communication device receiving the name resolution query responds to the name resolution query with the device address of the communication device if the device name of the communication device matches the selected device name.

17 Claims, 3 Drawing Sheets

(51) Int. Cl.
    *H04L 12/28* (2006.01)
    *H04L 12/40* (2006.01)

(52) U.S. Cl.
    CPC .... *H04L 12/2809* (2013.01); *H04L 12/40078* (2013.01); *H04L 61/6022* (2013.01); *H04L 61/6059* (2013.01); *H04L 2012/4026* (2013.01)

(56) References Cited

U.S. PATENT DOCUMENTS

| | | |
|---|---|---|
| 2006/0173955 A1 | 8/2006 | Lessman |
| 2015/0066979 A1 | 3/2015 | Zhang et al. |
| 2015/0312213 A1 | 10/2015 | Albrecht |
| 2016/0072929 A1* | 3/2016 | Alsup ................. H04L 47/2433 370/392 |
| 2016/0241511 A1 | 8/2016 | Albrecht |
| 2017/0006072 A1* | 1/2017 | Albrecht ............ H04L 61/2007 |

FOREIGN PATENT DOCUMENTS

| | | |
|---|---|---|
| DE | 102006027683 | 12/2007 |
| EP | 1686767 | 8/2006 |
| EP | 2940926 | 11/2015 |
| EP | 2940972 | 11/2015 |
| EP | 3041199 | 7/2016 |
| WO | 2007144364 | 12/2007 |
| WO | 2015142250 | 9/2015 |

OTHER PUBLICATIONS

Internet Engineering Task Force (IETF), Request for Comments (RFC) 4861, "Neighbor Discovery Protocol for IP version 6 (IPv6)", (2007).

Internet Engineering Task Force (IETF), Request for Comments (RFC) 6762, "Multicast DNS", (2013).

Office Action dated Mar. 12, 2021 issued in Chinese Patent Application No. 201880092759.3.

* cited by examiner

COMMUNICATION DEVICE, CONTROL UNIT AND METHOD FOR DETERMINING DEVICE ADDRESSES WITHIN A COMMUNICATION NETWORK OF AN INDUSTRIAL AUTOMATION SYSTEM

CROSS-REFERENCE TO RELATED APPLICATIONS

This is a U.S. national stage of application No. PCT/EP2018/060872 filed 27 Apr. 2018.

BACKGROUND OF THE INVENTION

1. Field of the Invention

The invention relates to a method for determining device addresses within a communication network of an industrial automation system, where the communication network comprises a plurality of communication devices that are each assigned a device name and at least one device address.

2. Description of the Related Art

Industrial automation systems are used to monitor, control and regulate technical processes, in particular in the field of production, process and building automation, and make it possible to operate control devices, sensors, machines and technical installations in a substantially independent manner. An important basis for reliably providing monitoring, control and regulating functions via a process automation system involves completely and correctly capturing and representing components of the industrial process automation system in an engineering or project planning system.

Interruptions in communication connections between computer units of an industrial automation system or automation devices may result in undesirable or unnecessary repetition of a transmission of a service request. In addition, messages that have not been transmitted or fully transmitted may prevent an industrial automation system from changing to or remaining in a safe operating state, for example. This may finally result in failure of a complete production installation and in costly production downtime. A particular problem regularly results, in industrial automation systems, from message traffic having a comparatively large number of, but relatively short, messages, thus intensifying the above problems.

WO 2007/144364 A1 relates to a method for networking an automated installation having at least one cell that has a subnetwork. The subnetwork is connected to a further subnetwork of the automated installation via a router. A multicast group is also provided and extends over the subnetwork and the further subnetwork. The multicast group is used to detect a network address of a network interface of an assembly which has previously joined the multicast group via the network address, where the network interface has been previously connected to the subnetwork. A name is assigned to the network interface of the assembly via the network address. In a further step, a further network address of the network interface of the assembly is determined, which further network address has at least one part of a numerical representation of the name.

EP 2 940 926 B1 discloses a method for configuring a communication device within an industrial automation system, in which a configuration unit of the communication device transmits a datagram containing a configuration request to a configuration server. The configuration server assigns at least one first topological device name component, which is assigned to a spatial or hierarchical arrangement of the configuration server, to the communication device in response to the configuration request. Each forwarding distributor unit adds a further topological device name component that is assigned to a spatial or hierarchical arrangement of the respective forwarding distributor unit. The configuration unit of the communication device generates its device name from the topological device name components and a name component which is unique within its subnetwork.

According to EP 2 940 972 B1, in order to provide a name service within an industrial communication system, router notifications containing name information from higher-level subnetworks are received by routers assigned to lower-level subnetworks and are supplemented by a topological or hierarchical name component assigned to the respective router and are disseminated within the respective lower-level subnetwork. Communication terminals independently generate their device name from topological or hierarchical name components and a name component that is unique within their respective subnetwork.

EP 3 041 199 A1 describes a method for determining communication device addresses within a communication network of an industrial automation system, in which a storage unit that respectively temporarily stores at least some name information that is provided by a communication network name service, is respectively assigned to selected communication devices of the industrial automation system. A connection set-up from a first selected communication device to a second communication device is started in an application or function of the industrial automation system, which is distributed among at least the first and second communication devices, based on the name service information stored in the storage unit assigned to the first communication device. In the event of a failed attempt to set up a connection, the application or function triggers an at least partial update of the temporarily stored name service information.

In industrial automation systems, PROFINET devices, for example, can transmit requests to other devices within their subnetwork using the Discovery and Configuration Protocol (DCP) in order to find a selected PROFINET device on the basis of its name. Corresponding requests are transmitted to all devices within the subnetwork using a broadcast, where the selected PROFINET device responds with its MAC address and optionally with its IP address. Further communication can then be handled in a targeted manner using these addresses. If an automation application comprises a large number of devices, the above procedure triggers numerous broadcasts with requests that result, on the one hand, in a considerable network load and, on the other hand, result in non-negligible processing outlay in devices which receive these requests.

Internet Engineering Task Force (IETF), Request for Comments (RFC) 4861 specifies a protocol for determining IP addresses of adjacent devices (Neighbor Discovery Protocol) in IPv6 communication networks, in which, although requests are transmitted to selected IP addresses using multicast, the requests are respectively transmitted only to one of a large number of multicast addresses. This makes it possible to considerably reduce a network load caused by the requests. Approaches, such as Multicast DNS according to IETF RFC 6762, are restricted purely to local LANs and do not provide for any selective use of multicast addresses that can be used to transmit name resolution requests only to a specific selection of receivers.

SUMMARY OF THE INVENTION

In view of the foregoing, it is therefore an object of the present invention to provide an apparatus and a method for determining device addresses within a communication network of an industrial automation system, which can be used to avoid an undesirable load as a result of name resolution requests in the communication network and in communication terminals to the greatest possible extent.

This and other objects and advantages are achieved in accordance with the invention by a method, a communication device and a control unit, wherein the method in accordance with the invention is used to determine device addresses within a communication network of an industrial automation system, in which the communication network comprises a plurality of communication devices, each of which is assigned a device name and at least one device address, in particular an IP and/or MAC address. For example, the communication devices may be components of automation devices. The communication devices each calculate a target value from their assigned device name using a predefined function. In addition, the communication devices each determine a multicast address from at least one part of the calculated target value and a selected multicast address stem, such as a prefix or an address component that can be combined with other address components.

The multicast address may be, in particular, an IPv4 or IPv6 multicast address, from which an Ethernet or MAC multicast address that can be used on the data link layer can in turn be derived. In principle, the multicast address may also be an Ethernet or MAC address that can be derived, for example, from an IPv4 or IPv6 multicast address. The predefined function is preferably a hash function, where the communication devices each determine their respective multicast address from a predefined bit range of the hash value calculated for their assigned device name and from the selected multicast address stem.

In accordance with the invention, the communication devices are each configured to receive multicast datagrams addressed to the determined multicast address. The communication devices are preferably each configured to reject received datagrams that are addressed to device addresses other than device addresses configured for reception for the respective communication device. For a name resolution request with respect to a selected device name, a control unit calculates a target value from the selected device name using the predefined function and determines a multicast address from at least one part of this target value and from the selected multicast address stem. The control unit may be, for example, a component of a selected or requesting communication device, in particular a controller inside one of a plurality of automation cells. In principle, other or further communication or automation devices may also comprise a corresponding control unit.

In accordance with the invention, the control unit addresses the name resolution request according to the multicast address determined for this name resolution request and transmits it as a multicast datagram. The control unit preferably addresses the name resolution request solely according to the multicast address determined for this name resolution request. A communication device receiving the name resolution request responds to the name resolution request by sending its device address to the control unit if its device name corresponds to the selected device name. In the most favorable case, the multicast address used for the name resolution request is assigned only to a single communication device sought, with the result that other communication devices need not process the name resolution request at all.

In accordance with one preferred embodiment of the present invention, the control unit calculates a hash value for the name resolution request with respect to the selected device name and determines the multicast address for the name resolution request from a predefined bit range of this hash value and from the selected multicast address stem. The predefined bit range preferably comprises a predefined number of least significant bits of the respective hash value, where the communication devices and the control unit use the same hash function. SHA-256 according to IETF RFC 6234 is advantageously used as the hash function.

The name resolution request can be effected, for example, in accordance with the PROFINET Discovery and Basic Configuration Protocol. In addition, multiply assigned device names can be detected based on the name resolution request if more than one receiving communication device responds to the name resolution request by sending its device address to the control unit.

The communication devices preferably each independently generate their device name from topological and/or hierarchical name components and a name component that is unique within their respective subnetwork, particularly in accordance with the methods described in EP 2 940 926 B1 and EP 2 940 972 B1, to the disclosure content of which reference is hereby made. As an alternative to independent generation by the communication devices, the device names for the communication devices may be predefined using an engineering system.

The communication device in accordance with the invention is provided for the purpose of implementing the method in accordance with the disclosed embodiments. A device name and at least one device address are assigned to the communication device. The communication device is configured to calculate a target value from its assigned device name using a predefined function. In addition, the communication device is configured to determine a multicast address from at least one part of the calculated target value and a selected multicast address stem. The communication device is also configured to receive multicast datagrams addressed to the determined multicast address, and to respond to a name resolution request by sending its device address to a requesting control unit if its device name corresponds to a device name selected for the name resolution request.

The control unit according to the invention is provided for the purpose of performing the method in accordance with disclosed embodiments, where the control unit is configured to calculate, for a name resolution request with respect to a selected device name, a target value from the selected device name using a predefined function and to determine a multicast address from at least one part of this target value and from a selected multicast address stem. In addition, the control unit is configured to address the name resolution request according to the multicast address determined for this name resolution request and to transmit it as a multicast datagram.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is described in more detail below using an exemplary embodiment on the basis of the drawing, in which.

DETAILED DESCRIPTION OF THE EXEMPLARY EMBODIMENTS

Figure 1:
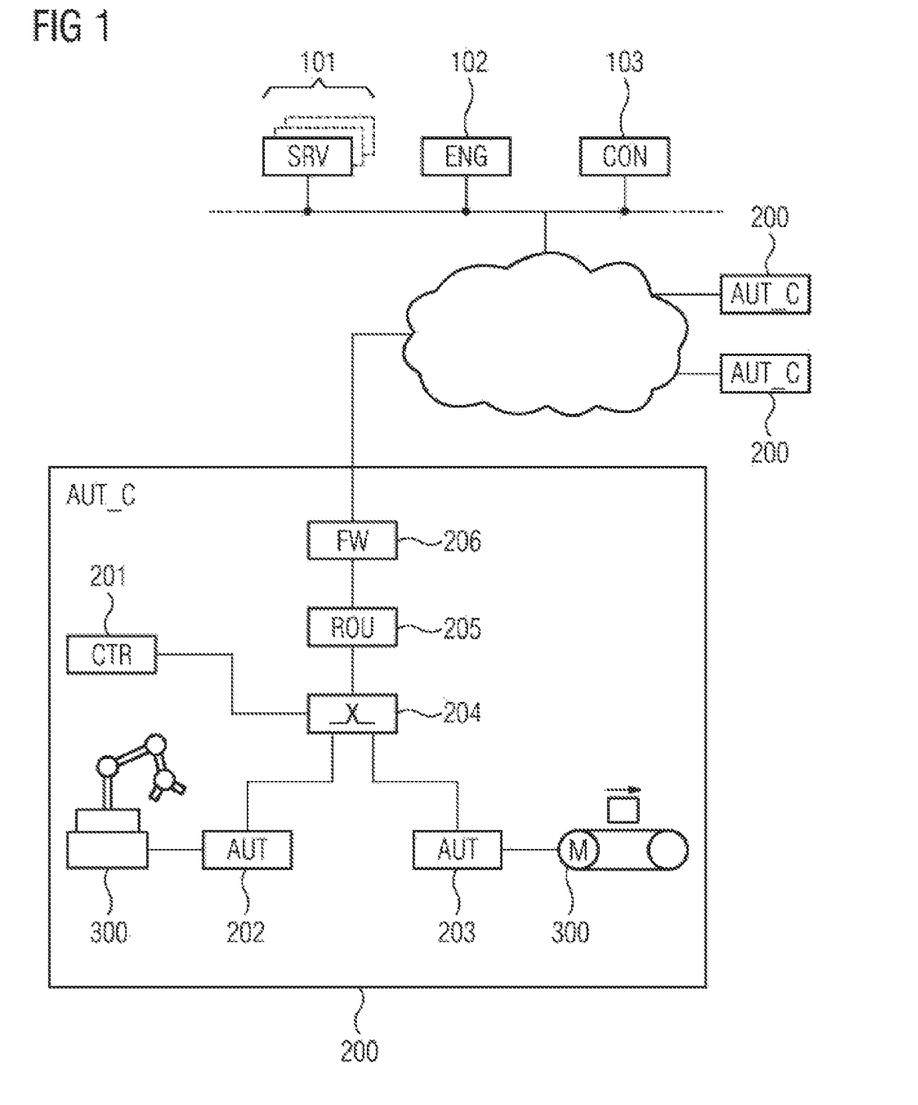
FIG. 1 shows an industrial automation system comprising a plurality of cells in accordance with the invention.

The industrial automation system illustrated in FIG. 1 comprises cells 200 each having a plurality of automation devices 201, 202, 203 that are connected to a switch 204 and, in the present exemplary embodiment, are connected to a cloud computing system 101 via a router 205 assigned to the respective cell 200. Here, a firewall system 206 is preferably connected upstream of the router 205. In principle, both the switch 204 and the firewall system 206 may be integrated in the router 205. The cloud computing system 101 respectively comprises a plurality of server units that provide an IT infrastructure, such as storage space, computing power or application software, as a service. In particular, the services provided by the server units may comprise applications or functions for monitoring the system, process and devices, for controlling and configuring devices, for capturing and analyzing measured values and state information assigned to the automation devices 201, 202, 203 as well as communication and automation functions.

The cells 200 may be connected to the cloud computing system 101, for example, via an IP-based wide area network 104 or via an industrial communication network. In the last-mentioned case, an edge or fog computing system, which functionally corresponds substantially to a cloud computing system and, in contrast with the latter, has different administrative control, takes the place of the cloud computing system 101. In the present exemplary embodiment, the cells 200 are also connected, via the wide area network 104, to an engineering system 102 for planning automation devices and to a control system 103 for monitoring automation devices.

The automation devices 201, 202, 203 may be, for example, operating and observation stations, programmable logic controllers, RFID readers or machine vision systems. In addition to the automation devices 201, 202, 203, network infrastructure devices, such as switches, routers or firewalls, may also be directly or indirectly connected to the router 205 and/or to the switch 204. These network infrastructure devices are used, in particular, to connect programmable logic controllers, input/output units (I/O modules) or operating and observation stations of the industrial automation system. Input/output units may be in the form of decentralized peripheral modules that are arranged remotely from a programmable logic controller.

Programmable logic controllers usually each comprise a communication module, a central unit and at least one input/output unit. Programmable logic controllers can be connected to the router 205, to the switch 204 and/or to a field bus, for example, via communication modules. Input/output units are used to interchange control and measurement variables between programmable logic controllers and machines or apparatuses 300 controlled by the programmable logic controllers. The central units are provided, in particular, for the purpose of determining suitable control variables from captured measurement variables. The above components of programmable logic controllers are preferably connected to one another via a backplane bus system.

Operating and observation stations are used to visualize process data or measurement and control variables that are processed or captured by programmable logic controllers, input/output units or sensors. In particular, operating and observation stations are used to display values of a control loop and to change control parameters. Operating and observation stations comprise at least one graphical user interface, an input device, a processor unit and a communication module.

Figure 2:
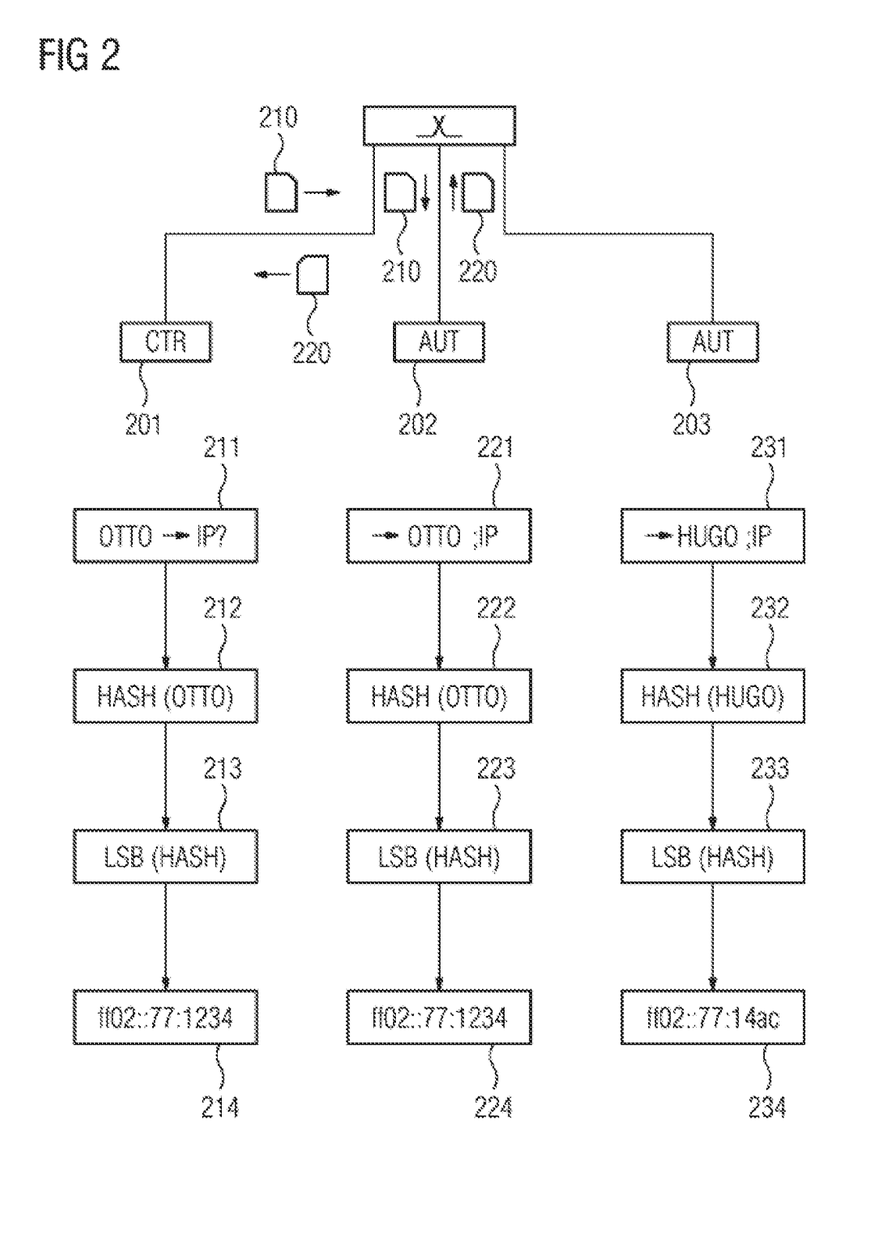
FIG. 2 shows a detailed illustration of an information processing flow inside a cell in the case of a name resolution request in accordance with the invention.

With reference to FIG. 2, a first automation device 201 attempts, within the scope of a name resolution request, to determine a device address of a second automation device 202 as a communication device to be addressed. The name resolution request can be effected, for example, according to the PROFINET Discovery and Basic Configuration Protocol (DCP). In the present exemplary embodiment, the first automation device 201 is a cell controller and comprises a control unit for name resolution requests. As a result of name resolution requests, the cell controller 201 determines, for example, device addresses of all other automation devices 202, 203 within its cell 200 on the basis of their configured device names. In addition, multiple assigned device names can be detected on the basis of name resolution requests if more than one automation device responds to a name resolution request by sending its device address to the cell controller 201.

In principle, the below-described exemplary embodiment applies not only to automation devices, but rather can be generally applied to communication devices. In particular, communication devices may be parts of automation devices. On the basis of a query with respect to a device name (step 211) as the basis for a name resolution request, the cell controller 201 calculates, for a selected device name (here: "OTTO"), a hash value from the selected device name using a hash function (step 212), gathers a predefined bit range from this hash value (step 213) and determines a multicast address for the name resolution request from this part of the hash value and from a selected multicast address stem (for example ff02::77:0) (step 214). Reserved address ranges for IPv6 multicast addresses are specified, for example, in IETF RFC 2375 (IPv6 Multicast Address Assignments).

In the present exemplary embodiment, the predefined bit range comprises a predefined number of least significant bits of the calculated hash value, such as the 16 least significant bits. SHA-256 according to IETF RFC 6234 is preferably used as the hash function. The cell controller 201 addresses the name resolution request precisely according to the multicast address determined for this name resolution request and transmits it as a multicast datagram 210.

With the above-described procedure, the name resolution request is addressed to precisely one of a large number of possible multicast addresses, in particular IPv6 multicast addresses, based on the selected device name. In comparison with the IPv6 multicast address ff02::1 for all network nodes, this means both a considerably reduced network load and a minimized load in the network nodes for evaluating the name resolution request. Ideally, the name resolution request must be evaluated only in one network node.

In addition to the second automation device 202, the cell 200, for which the information processing flow in the case of the name resolution request is illustrated in FIG. 2, comprises a third automation device. The starting point for the below-described embodiments is that both automation devices 202, 203 are each assigned a device name (here: "OTTO" and "HUGO") and a device address, in particular an IPv6 address (steps 221 and 231). For this purpose, the automation devices 202, 203 can each independently generate their device name from topological or hierarchical name components and a name component which is unique within their respective subnetwork. A detailed description of such independent generation of device names can be gathered, in particular, from EP 2 940 926 B1 and EP 2 940 972 B1. As an alternative to independently generating the device names, the device names for the two automation devices 202, 203 may be predefined using the engineering system 102.

In a similar manner to step 212, the automation devices 202, 203 each calculated a hash value from their assigned device name using a hash function (steps 222 and 232). According to steps 223 and 233, the automation devices 202, 203 gather a predefined bit range from the respective hash value (step 213) and each determine their respective multicast address for name resolution requests from this part of the hash value and from the selected multicast address stem (steps 224 and 234). Here, the cell controller 201 and the automation devices 202, 203 use the same hash function and the same multicast address stem and gather the same predefined bit range from the respectively calculated hash value. In addition, the second automation device 202 and the third automation device 203 may also each be configured via a corresponding control unit, similarly to the cell controller 201, to transmit name resolution requests to other automation devices.

In addition, the automation devices 202, 203 are configured to receive multicast datagrams addressed to the respectively determined multicast address. These multicast addresses are preferably registered with a functional unit of the respective automation device 202, 203 for processing an IP stack. In particular, the automation devices 202, 203 are each configured to reject received datagrams that are addressed to device addresses other than device addresses configured for reception for the respective automation device. Accordingly, an automation device receiving the name resolution request responds to the name resolution request by sending its device address to the cell controller 201 or to a requesting automation or communication device only if its device name corresponds to the selected device name. In the present exemplary embodiment, only the second automation device 202 therefore transmits a datagram 220 containing its IPv6 address to the cell controller in response to the name resolution request.

Multicast addresses determined in accordance with the above-disclosed embodiments affect not only the network layer (OSI layer 3) but also the data link layer (OSI layer 2). This is because Ethernet multicast addresses are derived from determined IPv4 or IPv6 multicast addresses according to IETF RFC 7042, Section 2.1.1 and IETF RFC 7042, Section 2.3.1.

Ethernet multicast addresses are derived from IPv4 multicast addresses by inserting the least significant 23 bits of the respective IPv4 multicast address into the Ethernet address 01-00-5e-00-00-00. Here, the situation may occur in which different IPv4 multicast addresses are mapped to the same Ethernet address.

IPv6 multicast addresses are mapped to Ethernet multicast addresses by inserting the least significant 4 bytes of the respective IPv6 multicast address into the Ethernet address 33-33-00-00-00-00. Here, the situation may also occur in which different IPv6 multicast addresses are mapped to the same Ethernet multicast addresses.

The derived Ethernet multicast addresses are each configured in an Ethernet communication network adapter of the respective automation or communication device. Ethernet frames addressed to Ethernet addresses which are not configured in the respective Ethernet communication network adapter are each rejected. This also makes it possible to achieve a considerably reduced network load in the case of name resolution requests on the Ethernet level.

Figure 3:
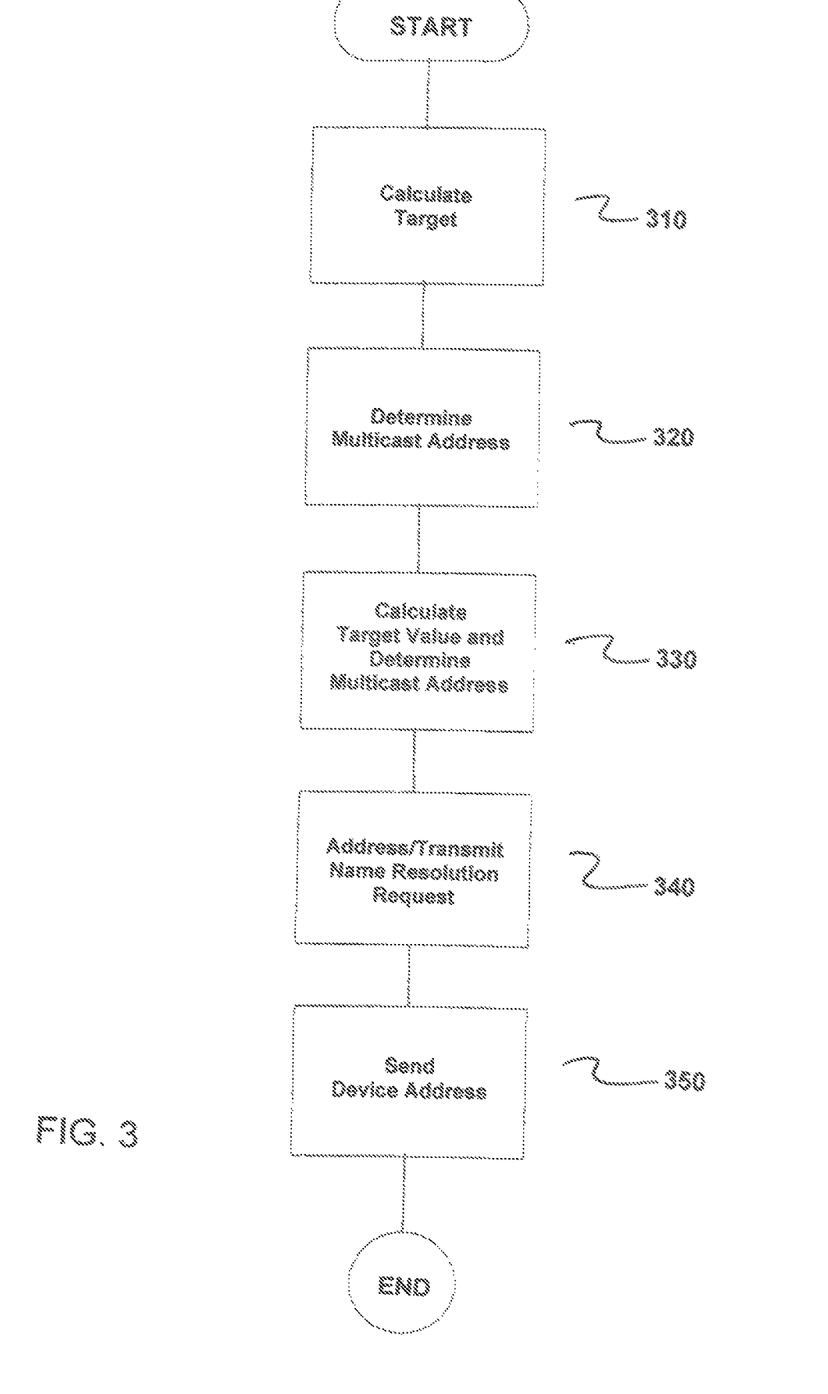
FIG. 3 shows a flowchart of the method in accordance with the invention.

FIG. 3 is a flowchart of the method for determining device addresses within a communication network of an industrial automation system, where the communication network comprise a plurality of communication devices 201, 202, 203 that are each assigned a device name and at least one device address. The method comprises calculating 212, 222, 232, by each communication device of the plurality of communication devices 201, 220, 203, a respective target value from a respective assigned device name utilizing a predefined function, as indicated in step 310.

Next, each communication device of the plurality of communication devices 201, 202, 203 determines 214, 224, 234 a respective multicast address from at least one part of the calculated respective target value and a selected multicast address stem, as indicated in step 320. In accordance with the invention, each communication device of the plurality of communication devices 201, 202, 203 is configured to receive multicast datagrams addressed to the determined respective multicast address.

Next, a control unit 201 calculates 212, for a name resolution request with respect to a selected device name, a target value from the selected device name utilizing the predefined function and determines 214 a multicast address from at least one part of the calculated target value and from the selected multicast address stem, a indicated in step 330.

Next, the control unit 201 addresses the name resolution request according to the multicast address determined for the name resolution request and transmits the addressed name resolution request as a multicast datagram 210, as indicated in step 340.

Next, a communication device 202 of the plurality of communication devices 201, 202, 203 that receives the name resolution request responds to the name resolution request by sending a device address of the responding communication device 202 to the control unit 201 if the device name of the responding communication device 202 corresponds to the selected device name, a indicated in step 350.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for determining device addresses within a communication network of an industrial automation system, the communication network comprising a plurality of communication devices which are each assigned a device name and at least one device address, the method comprising:
   calculating, by each communication device of the plurality of communication devices, a respective target value from a respective assigned device name utilizing a predefined function;
   determining, by each communication device of the plurality of communication devices, a respective multicast address from at least one part of the calculated respective target value and a selected multicast address stem, each of the plurality of communication devices being configured to receive multicast datagrams addressed to the determined respective multicast address,
   calculating, by a controller, for a name resolution request with respect to a selected device name, a target value from the selected device name utilizing the predefined function and determining a multicast address from at least one part of said calculated target value and from the selected multicast address stem;
   addressing, by the controller, the name resolution request according to the multicast address determined for said name resolution request and transmits the addressed name resolution request as a multicast datagram; and
   responding by a communication device of the plurality of communication devices receiving the name resolution request to the name resolution request by sending a device address of the responding communication device to the controller if the device name of the responding communication device corresponds to the selected device name.

2. The method as claimed in claim 1, wherein the predefined function is a hash function, and wherein each of the plurality of communication devices determine respective multicast addresses from a predefined bit range of the hash value calculated for their assigned device name and from the selected multicast address stem.

3. The method as claimed in claim 2, wherein the controller calculates a hash value for the name resolution request with respect to the selected device name and determines the multicast address for the name resolution request from the predefined bit range of said calculated hash value and from the selected multicast address stem.

4. The method as claimed in claim 2, wherein the predefined bit range comprises a predefined number of least significant bits of the respective hash value; and wherein the communication devices and the controller utilize the same hash function.

5. The method as claimed in claim 3, wherein the predefined bit range comprises a predefined number of least significant bits of the respective hash value; and wherein the communication devices and the controller utilize use the same hash function.

6. The method as claimed in claim 4, wherein Secure Hash Algorithm 256 (SHA-256) in accordance with Internet Engineering Task Force, Request for Comments (IETF RFC) 6234 is utilized as the hash function.

7. The method as claimed in claim 1, wherein the controller addresses the name resolution request solely according to the multicast address determined for this name resolution request.

8. The method as claimed in claim 1, wherein the industrial automation system comprises a plurality of automation cells; and wherein the controller is assigned to a cell controller of an automation cell.

9. The method as claimed in claim 1, wherein each of the plurality of communication devices form parts of automation devices.

10. The method as claimed in claim 1, wherein the controller forms part of a selected communication device.

11. The method as claimed in claim 1, wherein the name resolution request is effected in accordance with PROFINET Discovery and Basic Configuration Protocol.

12. The method as claimed in claim 1, wherein the plurality of communication devices is configured to reject received datagrams which are addressed to device addresses other than device addresses configured for reception for the respective communication device.

13. The method as claimed in claim 1, wherein a plurality of assigned device names is detected based on the name resolution request if more than one receiving communication device responds to the name resolution request by sending a respective device address of the receiving communication devices to the control unit.

14. The method as claimed in claim 1, wherein the plurality of communication devices each independently generate their device name from (i) at least one of topological name components and hierarchical name components and (ii) a name component which is unique within their respective subnetwork.

15. The method as claimed in claim 1, wherein the device names for the communication devices are predefined using an engineering system.

16. A communication device, comprising:
   a processor; and
   memory;
   wherein a device name and at least one device address are assigned to the communication device;
   wherein the communication device is configured to calculate a target value from a device name assigned to the communication device utilizing a predefined function;
   wherein the communication device is further configured to determine a multicast address from at least one part of the calculated target value and a selected multicast address stem;
   wherein the communication device is further configured to receive multicast datagrams addressed to the determined multicast address; and
   wherein the communication device responds to a name resolution request by sending the device address assigned to the communication device to a requesting controller if the assigned device name corresponds to a device name selected for the name resolution request.

17. A controller, comprising:
   a processor; and
   memory;
   wherein the controller is configured to calculate, for a name resolution request with respect to a selected device name, a target value from the selected device name utilizing a predefined function and to determine a multicast address from at least one part of the calculated target value and from a selected multicast address stem; and
   wherein the controller is further configured to address the name resolution request according to the multicast address determined for said name resolution request with respect to the selected device name and to transmit the addressed name resolution request as a multicast datagram to a communication device having the selected device name.

* * * * *